(12) United States Patent
Singh

(10) Patent No.: US 11,524,759 B2
(45) Date of Patent: Dec. 13, 2022

(54) METHOD AND PROCESS FOR CAPTURING CARBON DIOXIDE FROM MARINE ENGINES

(71) Applicant: SeaVar LLC, San Clemente, CA (US)

(72) Inventor: Uday Singh, San Clemente, CA (US)

( * ) Notice: Subject to any disclaimer, the term of this patent is extended or adjusted under 35 U.S.C. 154(b) by 0 days.

(21) Appl. No.: 17/394,617

(22) Filed: Aug. 5, 2021

(65) Prior Publication Data

US 2022/0048606 A1 Feb. 17, 2022

Related U.S. Application Data

(60) Provisional application No. 63/065,782, filed on Aug. 14, 2020.

(51) Int. Cl.
*B63H 21/32* (2006.01)
*F01N 3/04* (2006.01)
(Continued)

(52) U.S. Cl.
CPC ......... *B63H 21/32* (2013.01); *B01D 53/1406* (2013.01); *B01D 53/1412* (2013.01); *B01D 53/1475* (2013.01); *B01D 53/1481* (2013.01); *B01D 53/502* (2013.01); *B01D 53/62* (2013.01); *F01N 3/04* (2013.01); *F01N 3/085* (2013.01); *F01N 3/0857* (2013.01); *F01N 3/2066* (2013.01); *F01N 13/004* (2013.01); *B01D 2251/304* (2013.01); *B01D 2251/604* (2013.01); *B01D 2257/302* (2013.01);
(Continued)

(58) Field of Classification Search
CPC .... B01D 53/62; B01D 53/92; B01D 53/0462; B01D 53/047–053; B01D 2251/304; B01D 2251/402; B01D 2257/504; B01D 2259/65; B01D 2259/40007; B01D 2259/40009; B01D 2257/302; B01D 53/1481; B01D 53/48; B01D 53/50; B01D 53/60; F01N 3/00; F01N 3/0857; F01N 2570/10; F01N 2410/12; F01N 3/2046; F01N 3/085; F01N 3/0871; F01N 3/0885; F01N 3/0807; F01N 3/0814; F01N 3/0821; F01N 3/0828; F01N 3/0878; F01N 2570/04; Y02C 10/08; Y02C 10/04; Y02C 10/06
USPC ......... 60/297, 274, 273, 281, 282, 309, 310; 95/139; 423/220
See application file for complete search history.

(56) References Cited

U.S. PATENT DOCUMENTS 3,748,830 A * 7/1973 Ross .................. B01D 50/00
95/290
6,737,031 B2 5/2004 Beal et al.
(Continued)

FOREIGN PATENT DOCUMENTS

EP 1716909 B1 2/2006
EP 2404655 B1 11/2012

*Primary Examiner* — Micky H France
(74) *Attorney, Agent, or Firm* — Karthik Murthy; Murthy Patent Law PLLC

(57) ABSTRACT

A method and modular desulfurization-decarbonization apparatus for removing contaminants from exhaust gas is described. The apparatus comprises discrete modular units with distinct functions. The modular units may be housed in standard shipping containers and installed on cargo ships. The modules can be removed and replaced while docking with minimal disruption to ship and port operations.

18 Claims, 6 Drawing Sheets

(51) Int. Cl.

| | | |
|---|---|---|
| *F01N 13/00* | (2010.01) | |
| *B01D 53/14* | (2006.01) | |
| *B01D 53/50* | (2006.01) | |
| *B01D 53/62* | (2006.01) | |
| *F01N 3/08* | (2006.01) | |
| *F01N 3/20* | (2006.01) | |

(52) U.S. Cl.
CPC .. *B01D 2257/504* (2013.01); *B01D 2258/012* (2013.01); *F01N 2570/04* (2013.01); *F01N 2570/10* (2013.01); *F01N 2590/02* (2013.01)

(56) References Cited

U.S. PATENT DOCUMENTS

| | | |
|---|---|---|
| 7,919,064 B2 | 4/2011 | Kawatra et al. |
| 8,167,975 B2 | 5/2012 | Shimamura et al. |
| 8,486,357 B1 | 7/2013 | Ito et al. |
| 8,500,881 B2 | 8/2013 | Orita et al. |
| 8,673,257 B2 | 3/2014 | Reddy et al. |
| 8,802,043 B2 | 8/2014 | McDonald et al. |
| 8,951,489 B2 | 2/2015 | Priest et al. |
| 9,492,786 B2 | 11/2016 | Johnson et al. |
| 10,099,177 B2 | 10/2018 | Yasuda et al. |
| 10,646,820 B2 | 5/2020 | Kagawa et al. |
| 2008/0282883 A1* | 11/2008 | Rarig .................. B01D 53/047 96/113 |
| 2010/0229725 A1* | 9/2010 | Farsad .................. B01D 53/64 261/36.1 |
| 2011/0288184 A1* | 11/2011 | Nardo .................. B01D 53/229 423/239.1 |
| 2013/0280152 A1* | 10/2013 | Singh .................. B01D 53/62 423/232 |
| 2014/0059518 A1* | 2/2014 | Sierk .................. G06F 30/34 717/127 |
| 2014/0328739 A1* | 11/2014 | Silic .................. B01D 53/73 423/224 |
| 2020/0368679 A1* | 11/2020 | Lefebvre .......... B01D 53/1475 |

\* cited by examiner

METHOD AND PROCESS FOR CAPTURING CARBON DIOXIDE FROM MARINE ENGINES

FIELD OF THE INVENTION

The invention pertains to a method and process for capturing emissions of carbon dioxide (CO2) from diesel engines, and in particular, ship engines.

BACKGROUND

International shipping is a significant and expanding source of global greenhouse gas emissions. Emissions of carbon dioxide from marine engines used in shipping are projected to increase dramatically if effective mitigation measures are not quickly adopted. The European Union (EU) has been particularly proactive in addressing marine emissions. Beginning in January 2018, large ships over 5,000 gross tonnage operating in the European Economic Area (EEA) have been required to monitor and report their CO2 emissions. In addition, the EU in conjunction with the International Maritime Organization (IMO), has developed a GHG reduction strategy for international shipping. The goal is to decrease greenhouse gas emissions by at least 50% by 2050, compared to 2008 levels.

Marine engines are the largest diesel-fueled combustion devices, and diesel itself is the most polluting of all engine-fuel types. Combustion of this fuel results in emissions of nitrogen oxides (NOx), diesel particulate matter (DPM), sulfur dioxide (SO2), and CO2. While engine manufacturers have developed and installed emission controls for NOx and DPM, and others are developing scrubbers for removing SO2, no viable technology for shipboard control of CO2 emissions exists at this time. Recent regulations in the EU and United States have mandated capture of marine engine SO2 emissions (when using standard high sulfur diesel fuel) while in port and within 200 miles of coastlines. While some shipping lines have begun to install shipboard SO2 scrubbers, most have opted instead to switch to ultra-low sulfur fuels, the use of which reduces emissions of SO2. The ultra-low sulfur fuels, however, have historically cost much more than standard high sulfur fuel. There exists a need in the shipping industry for an economically attractive method for reducing greenhouse gas emissions.

SUMMARY

The inventors have developed a modular desulfurization-decarbonization apparatus for removing contaminants from exhaust gas comprising a desulfurizing and decarbonizing reactor module, an equipment module, and a chemical storage module. The apparatus removes up to 99% or more of the SO2 and >90% of the CO2 present in marine exhaust gas. The modularity of the apparatus enables rapid unloading and replacement of modules when in port, and does not prolong a ship's time in port. The modular units each be housed in a distinct International Organization for Standardization (ISO) standard shipping container. The size of each standard shipping container is independently selected from the group consisting of consisting of 10 ft., 20 ft., 40 ft., 20 ft. high cube, and 40 ft. high cube. By employing shipping containers, installation on a cargo ship requires minimal modification. The use of shipping containers allows existing crane units to unload and replacement modular containers. The modular system provides a novel solution for reducing greenhouse gas emissions in ships.

In some aspects, a modular desulfurization-decarbonization apparatus as disclosed herein comprises a desulfurizing and decarbonizing reactor module, an equipment module, and a chemical storage module. In some embodiments, the modular desulfurization-decarbonization apparatus comprises an exhaust gas conduit coupled to the desulfurizing and decarbonizing reactor module. In some aspects, the desulfurizing and decarbonizing reactor module comprises a desulfurizer for removing SO2 and a decarbonizer for removing CO2. In some aspects, the desulfurizer is upstream of the decarbonizer. In some embodiments, the desulfurizing and decarbonizing reactor module comprise a second decarbonizer downstream of the decarbonizer. In some aspects, the desulfurizing and decarbonizing reactor module comprises at least one SO2-lean gas fan. In some embodiments, the desulfurizing and decarbonizing reactor module comprises at least one first liquid reagent transfer pump. In some aspects, the desulfurizing and decarbonizing reactor module comprises at least one CO2-lean gas fan. In some embodiments, the desulfurizing and decarbonizing reactor module comprises at least one second liquid reagent transfer pump. In some aspects, the modular desulfurization-decarbonization apparatus comprises two or more chemical storage modules. In some embodiments, the modular desulfurization-decarbonization apparatus comprises at least one fresh chemical storage module and at least one spent chemical storage module.

In some aspects, the desulfurizer comprises an exhaust gas inlet coupled to the exhaust gas conduit. In some embodiments, the desulfurizer comprises a first liquid reagent distribution header. In some embodiments, the first liquid reagent distribution header comprises one or more liquid reagent outlets. In some aspects, the liquid reagent outlets are liquid-orifice outlets or liquid-slotted outlets. In some aspects, the liquid reagent outlets are liquid-orifice outlets or liquid-slotted outlets designed to distribute the liquid over a sieve or slotted tray above the surface of the packing. In some embodiments, the desulfurizer comprises an SO2-lean gas outlet. In some aspects, the SO2-lean gas conduit is coupled to the SO2-lean gas outlet. In some embodiments, the SO2-lean gas conduit comprises a mist eliminator.

In some embodiments, the decarbonizer comprises an SO2-lean gas inlet coupled to the SO2-lean gas conduit. In some aspects, the decarbonizer comprises a CO2-lean exhaust gas outlet. In some aspects, the decarbonizer comprises a second liquid reagent distribution header. In some embodiments, the second liquid reagent distribution header comprises one or more liquid reagent outlets. In some embodiments, the decarbonizer comprises a CO2-lean gas outlet. In some aspects, the decarbonizer comprises a CO2-lean gas conduit coupled to the CO2-lean exhaust gas outlet. In some aspects, the CO2-lean gas outlet is coupled to a ship exhaust funnel. In some aspects, the CO2-lean gas outlet could discharge directly to the atmosphere without returning to the ship funnel.

In some embodiments, the equipment module comprises a first liquid reagent pump. In some aspects, the equipment module comprises a second liquid reagent pump. In some embodiments, the equipment module comprises an SO2-enriched liquid pump. In some embodiments, the equipment module comprises a CO2-enriched liquid reagent pump. In some aspects, the equipment module comprises a recirculation tank. In some embodiments, the recirculation tank is housed within the equipment module. In other embodiments, the recirculation tank is housed within a distinct module. In some aspects, the recirculation tank comprises a segregated spent sulfite tank. In some embodiments, the recirculation tank comprises a segregated sulfite recirculation tank. In some embodiments, the recirculation tank comprises a segregated spent carbonate tank. In some aspects, the recirculation tank comprises a segregated makeup water tank. In some aspects, the equipment module comprises a control system. In some embodiments, the control system includes software to allow real-time global monitoring of individual or fleet capture of CO2 and SO2. In some aspects, the control system is a Programmable Logic Controller (PLC). In some aspects, flow and temperature sensors used by PLC are used to automatically adjust gas and liquid flows based on engine load. In some embodiments, the PLC allows initiation of system bypass and control transfer to the ship bridge.

In some embodiments, the equipment module comprises a Human Machine Interface. In some aspects, the equipment module comprises a Supervisory Control and Data Acquisition device. In some embodiments, the equipment module comprises system instrumentation. In some embodiments, the equipment module control system includes software for remote monitoring of exhaust CO2, SO2, system operating parameters, diagnostics of malfunctions and activation of corrective actions. Remote monitoring may be performed up to and including 24 hours per day.

In some aspects, the chemical storage module comprises a spent liquid reagent tank. In some aspects, the chemical storage module comprises a segregated spent sulfite tank. In some embodiments, the storage module comprises a segregated spent carbonate tank. In some aspects, at least one chemical storage module comprises a spring-loaded floor opening. In some aspects, at least one chemical storage module comprises a spring-loaded floor opening controlled by a level sensor installed at the top of the module. In some aspects, at least one chemical storage module comprises a spring-loaded roof opening. In some aspects, two or more chemical storage modules are provided in a vertically-stacked configuration. When multiple chemical storage modules are provided in a stacked configuration, the spring-loaded floor opening allows spent liquid reagent to drain down to the bottom-most chemical storage module and fill the chemical storage modules in a sequential, bottom-up manner. In some embodiments, the desulfurization-decarbonization apparatus comprises one or more leak sensors. In some aspects, any of the modules disclosed herein may comprise double-wall container construction to prevent leaks from leaving containers.

In some embodiments, a control louver damper is coupled to a ship's exhaust funnel. In some embodiments, the control louver damper is coupled to at least one exhaust gas conduit. In some aspects, the control louver damper is coupled to a port-side exhaust gas conduit and a starboard-side exhaust gas conduit. In some aspects, the modular desulfurization-decarbonization apparatus is a port-starboard symmetrical system having an even number of each component, with at least one starboard-side component and at least one port-side component. In some aspects, the modular desulfurization-decarbonization apparatus comprises a port-side desulfurizing and decarbonizing reactor module, a starboard-side desulfurizing and decarbonizing reactor module, a port-side equipment module, a starboard-side equipment module, a port-side chemical storage module, and a starboard-side chemical storage module. In some aspects, the port-side modules are provided in a stacked configuration on a port-side of a ship, and the starboard-side modules are provided in a stacked configuration on a starboard-side of the ship. In some aspects, each of the port-side modules is fluidly coupled to at least one other port-side module. In some embodiments, each of the starboard-side modules is fluidly coupled to at least one other starboard-side module.

Some aspects of the disclosure are directed to a method for removing CO2 and SO2 from an exhaust gas stream using a modular desulfurization-decarbonization apparatus. In some embodiments, the method comprises the steps of directing an exhaust gas stream into a desulfurizing and decarbonizing reactor module comprising a desulfurizer and decarbonizer, bringing the exhaust gas stream into contact with a first liquid reagent in the desulfurizer and absorbing into the reagent at least a part of the SO2 of the exhaust gas stream such that the gas stream is depleted in SO2 and the reagent is enriched in SO2, bringing the SO2-depleted gas into contact with a second liquid reagent in the decarbonizer and absorbing into the reagent at least a part of the CO2 of the SO2-depleted gas such that the gas stream is depleted in both SO2 and CO2 and the second reagent is enriched in CO2, and exhausting the SO2- and CO2-depleted gas to the atmosphere.

In some embodiments, the SO2-enriched reagent is transferred to an equipment module. In some aspects, the SO2-enriched reagent is transferred to a recirculation tank within the equipment module. In some embodiments, the SO2-enriched reagent is transferred to a segregated spent sulfite tank within the recirculation tank. In some aspects, the SO2-enriched reagent is transferred to a chemical storage module.

In some embodiments, the CO2-enriched reagent is transferred to an equipment module. In some aspects, the CO2-enriched reagent is transferred to a recirculation tank within the equipment module. In some embodiments, the CO2-enriched reagent is transferred to a segregated spent sulfite tank within the recirculation tank. In some aspects, the CO2-enriched reagent is transferred to a chemical storage module.

In some aspects, the exhaust gas stream is divided into a port-side exhaust gas stream and a starboard-side exhaust gas stream. In some aspects, a control louver damper coupled to a ship exhaust funnel divides at least a portion of the ship exhaust gas stream into a port-side exhaust gas stream and a starboard-side exhaust gas stream. The control louver damper can be adjusted to divert 1, 2, 3, 4, 5, 6, 7, 8, 9, 10, 11, 12, 13, 14, 15, 16, 17, 18, 19, 20, 21, 22, 23,24,25,26,27,28,29, 30,31, 32,33, 34,35, 36,37, 38,39,40, 41,42,43,44,45,46,47,48, 49, 50, 51, 52, 53, 54, 55, 56, 57, 58, 59, 60,61, 62,63, 64,65, 66,67, 68,69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 percent of the ship's exhaust gas toward the modular desulfurization-decarbonization apparatus. In some embodiments, the diverted exhaust gas stream is divided essentially equally into a starboard-side exhaust gas stream and a port-side exhaust gas stream. In some embodiments, the port-side exhaust gas stream is directed to a port-side desulfurizing and decarbonizing reactor module. In some aspects, the starboard-side exhaust gas stream is directed to a starboard-side desulfurizing and decarbonizing reactor module.

In some aspects, starboard-side SO2-enriched reagent is transferred to a starboard-side equipment module. In some embodiments, port-side SO2-enriched reagent is transferred to a port-side equipment module. In some embodiments, starboard-side SO2-enriched reagent is transferred to a starboard-side chemical storage module. In some embodiments, port-side SO2-enriched reagent is transferred to a port-side chemical storage module.

In some aspects, starboard-side CO2-enriched reagent is transferred to a starboard-side equipment module. In some embodiments, port-side CO2-enriched reagent is transferred to a port-side equipment module. In some embodiments, starboard-side CO2-enriched reagent is transferred to a starboard-side chemical storage module. In some embodiments, port-side CO2-enriched reagent is transferred to a port-side chemical storage module.

In some aspects, the method for removing CO2 and SO2 from an exhaust gas stream comprises controlling gas and liquid transfer from an equipment module. In some embodiments, controlling gas and liquid transfer is controlled by a control system housed within the equipment module. In some aspects, a port-side equipment module controls port-side gas and liquid transfer and a starboard-side equipment module controls starboard-side gas and liquid transfer. In some embodiments, each module is housed within a distinct standard ISO shipping container. A typical 20-foot long container is known as a Twenty Foot Equivalent (TEU), while a 40 feet long container is known as a Forty Foot Equivalent (FEU). Containers are also available with increased height and are known as High Cube containers. The methods and apparatus disclosed herein allow for the use of any size shipping container, and can be used for any container ship and engine size.

Ducting, louver damper, inlet and outlet transitions, p1pmg, electrical and instrument wiring, and selected containers may be permanently or temporarily installed on the ship. Containers are loaded and unloaded in port are transferred using the same crane that loads and unloads the ship's cargo containers.

It is specifically contemplated that any limitation discussed with respect to one embodiment of the invention may apply to any other embodiment of the invention. Furthermore, any composition of the invention may be used in any method of the invention, and any method of the invention may be used to produce or to utilize any composition of the invention.

The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, the methods and systems of the present invention that "comprises," "has," "includes" or "contains" one or more elements possesses those one or more elements, but is not limited to possessing only those one or more elements. Likewise, an element of a method or system of the present invention that "comprises," "has," "includes" or "contains" one or more features possesses those one or more features, but is not limited to possessing only those one or more features.

Any method or system of the present invention can consist of or consist essentially of-rather than comprise/include/contain/have-any of the described elements and/or features and/or steps. Thus, in any of the claims, the term "consisting of" or "consisting essentially of" can be substituted for any of the open-ended linking verbs recited above, in order to change the scope of a given claim from what it would otherwise be using the open-ended linking verb.

Throughout this application, the term "about" is used to indicate that a value includes the standard deviation of error for the device and/or method being employed to determine the value.

The term "substantially" is defined as being largely but not necessarily wholly what is specified (and include wholly what is specified) as understood by one of ordinary skill in the art. In any disclosed embodiment, the term "substantially" may be substituted with "within [a percentage] of" what is specified, where the percentage includes 0.1, 1, 5, and 10 percent.

As used herein, in the specification, "a" or "an" may mean one or more, unless clearly indicated otherwise. As used herein, in the claim(s), when used in conjunction with the word "comprising," the words "a" or "an" may mean one or more than one. As used herein "another" may mean at least a second or more.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

DETAILED DESCRIPTION

Figure 1:
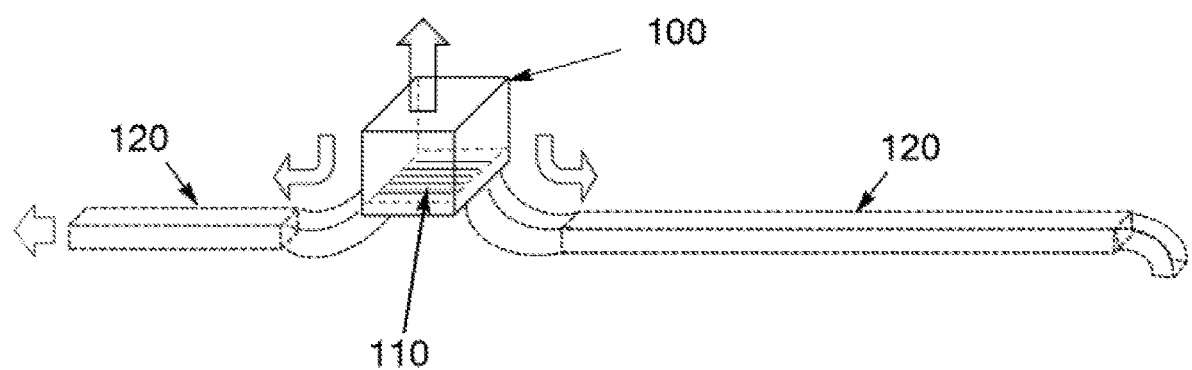
FIG. 1 is an illustration of a control louver damper installed inside duct connected to the top of an existing ship exhaust funnel. This damper intercepts exhaust gas flow in the duct and diverts at least a portion of the exhaust gas through exhaust gas conduits.

Disclosed herein is a modular apparatus and method for the capture of emissions from diesel engines. The method involves absorption of SO2 and CO2 using custom-designed modules. The modules may each be housed within an ISO standard size shipping container. Because the modules are housed within standard shipping containers, the modules may be installed on container ships with minimal modification to the ship. For other types of ships (tanker, vehicle transport, cruise and other), the same equipment may be installed in containers or in other shells, depending on the configuration of each vessel.

In some aspects, the method disclosed herein involves removal of exhaust gas SO2 emissions prior to removal of CO2. This feature allows ship owners currently using expensive low sulfur diesel to revert to cheaper high sulfur diesel, for which the marine engines were originally designed, while achieving compliance with 2020 SO2 emission regulations.

In some aspects, the method involves the use of a modular apparatus that comprises a desulfurizing and decarbonizing reactor module, an equipment module, and a chemical storage module. In some aspects, the modular apparatus is divided into a symmetrical system whereby exhaust gas is split and diverted to port and starboard sides of a ship. The port exhaust gas is processed using a port-side desulfurizing and decarbonizing reactor module, a port-side equipment module, and a port-side chemical storage module. The starboard exhaust gas is processed using a starboard-side desulfurizing and decarbonizing reactor module, a starboard-side equipment module, and a starboard-side chemical storage module. By dividing the modules into port- and starboard-side units, the total apparatus weight can be distributed evenly on port and starboard sides of the ship.

The modules may be permanently installed with a ship, or may be removably installed. In some aspects, the desulfurizing and decarbonizing reactor and equipment modules are permanently installed, and the chemical storage modules are removably installed. This arrangement allows for rapid removal and replacement of chemical storage modules housing spent reagents, while the reactor and equipment modules remain on the ship. Removable modules may be fitted with quick-connect and disconnect components to allow rapid module removal and installation in designated shipboard locations. In some embodiments, a module is fitted with pump-in and pump-out flanges with valves for feed and discharge of fresh and spent reagents and make-up water. Modules may be fitted with ducting, dampers with actuators, quick-connect and disconnect entrance and discharge gas hoods and vane distribution assemblies for gas conveyance and control. In some aspects, ducts and/or piping is fitted with expansion joints to allow for duct and piping movement in heavy seas.

The methods disclosed herein employ one or more chemical reagents to absorb SO2 and CO2 in a custom-designed, modular system installed in a set of modular containers. The modular system can include one or more stages of a desulfurizer reactor (for SO2 capture) and a decarbonizer reactor (for CO2 capture), custom-engineered mass transfer packing specifically designed for SO2 and CO2 capture, reagent hold tanks for storage of the fresh and spent chemical reagents, a system of recirculating pumps and piping to convey fresh reagent to distribution headers located above the packing, and reagent outlets, trays and valves to distribute reagent uniformly over the surface of the packing. In some aspects, the packing has been extensively tested for the capture of SO2 and CO2. The modular system may further include blowdown pumps, piping, valves, and related components like fittings and flanges to remove the reaction products and convey these to a spent chemical storage tank or tanks. Spent chemicals may be sold or regenerated. In some aspects, the modular system includes a ship- or land-based regeneration system for collection and transfer of reclaimed reagents and/or for production of pure CO2. In some aspects, the modular system includes instrumentation to control, measure, and record process parameters in various areas of the decarbonizer, desulfurizer, and optional regeneration systems. In some aspects, an equipment module includes one or more of a Programmable Logic Controller (PLC), Human Machine Interface (HMI), and Supervisory Control and Data Acquisition (SCADA) device to automatically control process parameters. The equipment module may include equipment to record performance data, transmit selected data to a cloud-based storage device to allow remote monitoring and troubleshooting, and enable a dedicated control panel in the ship bridge to allow manual intervention of the equipment in the event of a system problem. A core and recurring feature of the apparatus and methods disclosed herein is the emphasis placed on capturing SO2 and CO2 without disruption to ship or port operations.

A. Process Flow Sequence

Exhaust gas from a ship engine is discharged to the atmosphere from a funnel located above the upper deck of the vessel. In the modular desulfurization-decarbonization apparatus depicted in FIG. 1, control louver damper 110 is installed inside duct 100 connected to an existing exhaust funnel. This damper intercepts exhaust gas flow in the duct and diverts at least a portion of the exhaust gas through exhaust gas conduits 120 to the desulfurizer and decarbonizer system. The degree to which exhaust gas is diverted is controlled by modulating the angle of the louvers. When the damper is in the fully open position, the exhaust gas reverts to normal discharge from the funnel to the atmosphere. The modular desulfurization-decarbonization apparatus can be programmed to fully open the louvers in the event of a malfunction. The louvers can also be manually controlled remotely or from the ship bridge. The damper is a louver design with multiple blades. The angle of the blades determines the volume of gas diverted to the desulfurization-decarbonization system, and may be automatically modulated by the PLC to vary this flow volume as needed. This modulation may be conducted slowly, so as to not affect back pressure on the ship engine.

With the damper closed, 100% of the exhaust gas is directed through exhaust gas conduits 120 equally to the starboard and port sides of the ship. On each side, the exhaust gas enters an essentially identical system of modular contaminant-removal containers. Distributing the essentially identical modular containers equally on each side helps minimize ship roll along its longitudinal axis.

Figure 2:
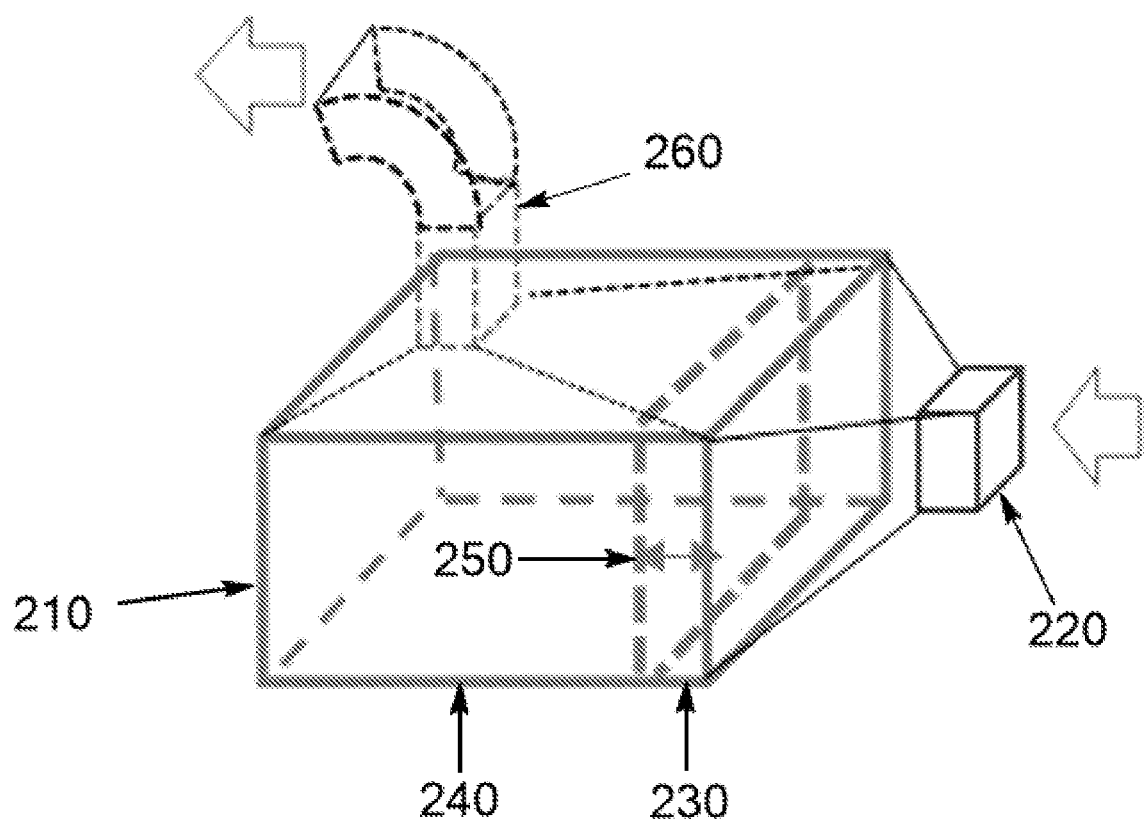
FIG. 2 depicts an embodiment of a desulfurizing and decarbonizing reactor module that includes a desulfurizer and a decarbonizer separated by a mist eliminator.

An embodiment of a desulfurizing and decarbonizing reactor module 210 is depicted in FIG. 2. The reactor module includes exhaust gas inlet 220. Exhaust gas travels through inlet 220 into a first desulfurizer section 230. The exhaust gas is contacted with a first liquid reagent, e.g., a NaOH solution that dissolves SO2 and reduces exhaust gas temperature to its adiabatic saturation temperature. SO2 reacts with water to form H2SO3, which in turn is converted to NaHSO3 and Na2SO3$^2$ in the alkaline environment. The resulting SO2-enriched liquid flows vertically downward to a sulfite section of a recirculation tank. When the gas has passed through the desulfurizer, almost 100 percent of the SO2 has been captured, even if the fuel used in the engine is high sulfur diesel with more than 3.5 percent sulfur content.

The SO2-lean gas then passes through optional mist eliminator 250. The mist eliminator serves to remove any sulfite-containing droplets that may otherwise be entrained in the gas passing into the decarbonizer, and drains into the liquid flowing to the recirculation tank. The mist eliminator resides between the desulfurizer and decarbonizer components.

The SO2-lean gas next enters decarbonizer 240 located within reactor module 210. The decarbonizer and desulfurizer are physically separated from each other. In the decarbonizer, intimate contact occurs between the SO2-lean gas and a second liquid reagent. In some embodiments, the second liquid reagent is a solution of NaOH. CO2 in the gas dissolves into the second liquid reagent, forming Na2CO3 and NaHCO$_3$. The resulting CO2-enriched liquid flows vertically downward to a carbonate section of a recirculation tank. The desulfurizer and/or the decarbonizer may be fitted with packing that promotes intimate contact between exhaust gas and liquid reagent. In some embodiments, greater than 90 percent of the CO2 in the gas is removed in the decarbonizer. The resulting SO2- and CO2-lean gas exits module 210 through exhaust gas outlet 260. The SO2- and CO2-lean gas passes through an exhaust duct to the existing ship funnel downstream of control louver damper, or through a distinct funnel and is exhausted to the atmosphere.

Figure 3:
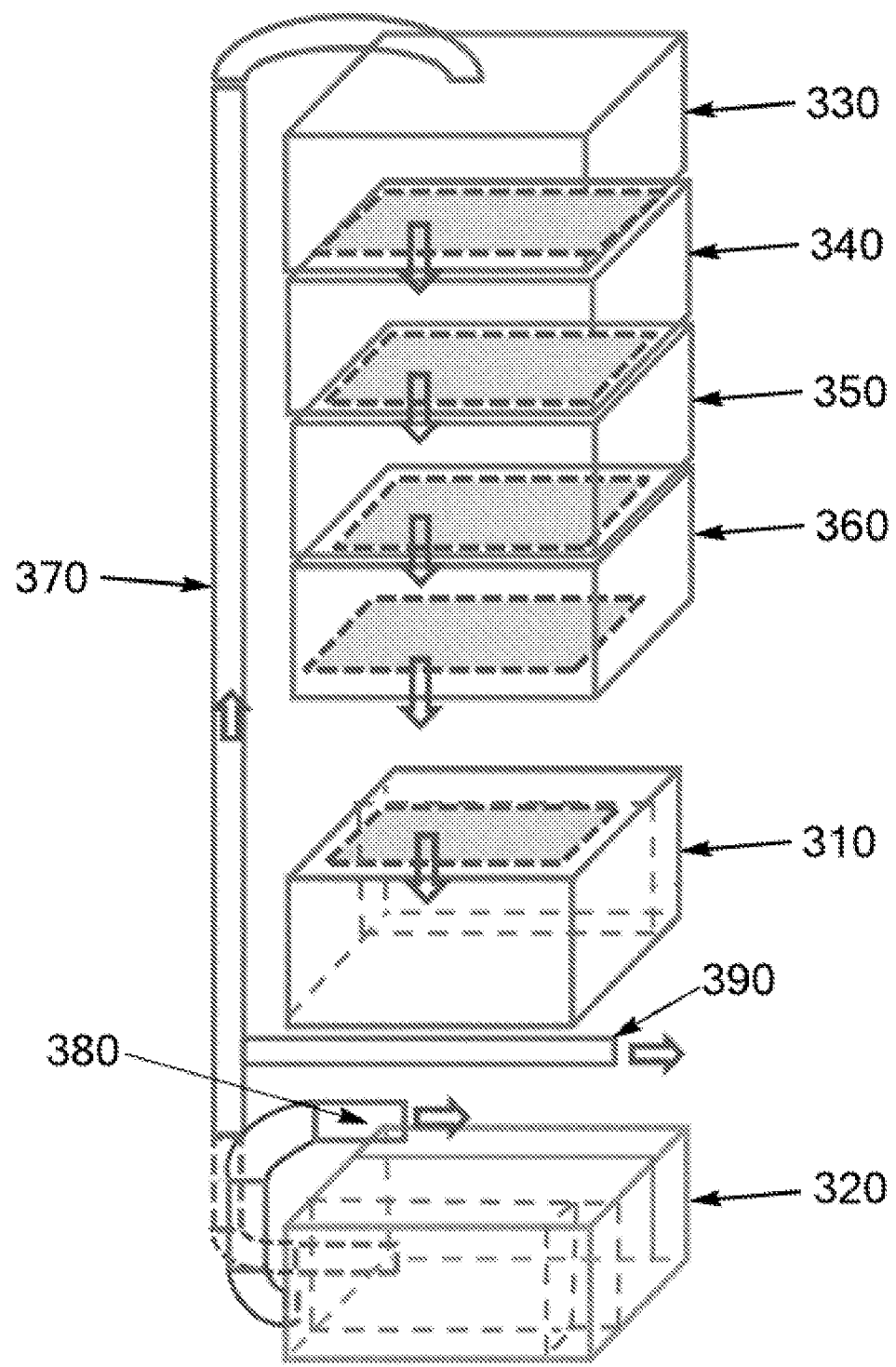
FIG. 3 depicts an embodiment of a modular a desulfurizing and decarbonizing apparatus that includes a desulfurizing and decarbonizing reactor module, an equipment module, and four chemical storage modules.
Figure 4:
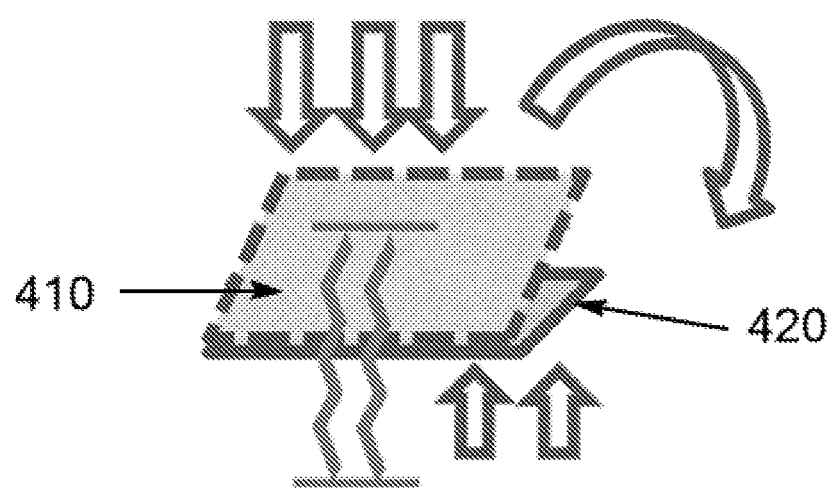
FIG. 4 illustrates a hinged and spring-loaded floor opening for a chemical storage module.

The embodiment depicted in FIG. 3 includes desulfurizing and decarbonizing reactor module 310, equipment module 320, and chemical storage modules 330, 340, 350, and 360. First reagent line 380 is coupled to desulfurizer of reactor module 310 (connection not depicted for clarity) and provides desulfurizer with first reagent. Second reagent line 390 is coupled to decarbonizer of reactor module 310 (connection not depicted for clarity) and provides decarbonizer with second reagent. Equipment module 320 feeds spent reagent through blowdown line 370 to chemical storage modules 330, 340, 350, and 360. The hinged and spring-loaded floor and matching roof openings in storage modules 330, 340, 350, and 360 are more clearly depicted in FIG. 4. The storage modules include a floor-opening 420 with a solid flap 410 that may be in an open or closed position. Solid flap 410 is connected to a liquid-level switch at or near the top of the storage module. When spent reagent is transferred to chemical storage modules 330, 340, 350, and 360 in FIG. 3, the floor- and roof-openings in modules 330, 340, and 350 are in an open position. The floor opening in module 360 is in a closed position. Upon module 360 becoming filled with spent reagent, the open floor in module 350 would be switched to a closed position, effectively sealing the floor of module 350. This allows module 350 to be filled with spent reagent that travels through open floors and roofs of modules 330 and 340.

B. Desulfurizer Technology

The SO2 in the gas entering the desulfurizer dissolves in and reacts with an alkaline reagent (e.g., NaOH or KOH) contained in and added from dedicated reagent storage tanks. The SO2 is converted into Na2SQ3 in the desulfurizer. This reagent is recirculated from a sulfite section of a recirculation tank through the desulfurizer and is returned to the tank. The spent, SO2-enriched reagent contains sodium sulfite (Na2SO3), sodium bisulfite (NaHSO3), and sodium sulfate (Na2SO4). The reactions in the desulfurizer include:

$$2NaOH+SO_2 \rightarrow Na_2SO_3+H_2O$$

$$Na_2SO_3+SO_3+H_2O \rightarrow 2NaHSO_3$$

A small amount of Na2SQ4 may be formed, depending on the pH of the recirculating reagent. The pH of the liquid reagents may be adjusted by addition of NaOH, and may be carefully controlled by the PLC within a selected operating band defined by the engine fuel sulfur, engine load, and other parameters.

C. Decarbonizer Technology

When the exhaust gas leaves the desulfurizer and mist eliminator, it passes through the decarbonizer. The reactions that occur in the decarbonizer include:

$$CO_2+H_2O \rightarrow H_2CO_3$$

$$H_2CO_3+NaOH \rightarrow Na^++HCO_3^-+H_2O$$

$$HCO_3^-+NaOH \rightarrow Na^++CO_3^{2-}+H_2O$$

The CO2 in the gas reacts with the water in the second liquid reagent to form carbonic acid (H2CO3), which then reacts with NaOH (contained in and added from dedicated tanks) to form a mixture of sodium bicarbonate (NaHCO3) and sodium carbonate (Na2CO3). The carbonate and bicarbonate are in equilibrium depending on the pH of the reagent, and these reactions are reversible. By careful control of pH by the PLC, this equilibrium may be shifted to the formation of sodium bicarbonate to ensure there is no off-gassing of CO2 in the decarbonizer. The CO2-enriched reagent is then returned to the recirculation tank.

D. NaOH Regeneration

The apparatus disclosed herein may be configured to regenerate NaOH from Na2CO3. NaOH regeneration may be performed in a dedicated regeneration module. The Na2CO3 produced by CO2 capture may be reacted with widely available and inexpensive calcium hydroxide (Ca(OH)2). The reaction is:

$$Na_2CO_3+Ca(OH)_2 \rightarrow 2NaOH+CaCO_3$$

The regenerated NaOH is a clear liquid and may recovered by decanting from precipitated calcium carbonate (CaCO3) solids with the aid of a clarifier, centrifuge, or other commonly used device. The regenerated NaOH may be re-used in the desulfurizing and decarbonizing method described herein. Collected CaCO3, also known as limestone, may be sold for use in the chemical and other industries.

NaOH may also be regenerated by thermal decomposition of Na2CO3. The initial product is solid sodium oxide (Na2O). The reaction is:

$$Na_2CO_3 \rightarrow Na_2O+CO_2$$

The CO2 product is in the form of a gas, and may be collected and compressed for storage in low pressure tanks. The gaseous CO2 may be sold for the manufacture of various chemicals, including biofuels, or for use in carbonated beverages and industrial scale greenhouses.

The solid Na2O may then be collected and hydrated to produce NaOH. The reaction is $$Na_2O+H_2O \rightarrow 2NaOH$$

The regenerated NaOH may be used on the shop as a decarbonizing and/or desulfurizing reagent.

NaOH may also be regenerated from Na2SO3 by reacting the Na2SO3 with widely available and inexpensive calcium hydroxide (Ca(OH)2). The reaction is:

$$Na_2SO_3+Ca(OH)_2 2NaOH+CaSO_3$$

The regenerated NaOH is a clear liquid and may recovered by decanting from by settling the calcium sulfite (CaSO3) solids in a clarifier, centrifuge, or other commonly used device. Alternatively, the CaSO3 may be oxidized after collection of NaOH by reducing the pH to produce calcium sulfate (CaSO4), also known as gypsum. This is widely used in the production of wallboard, used in construction.

Examples

Figure 5:
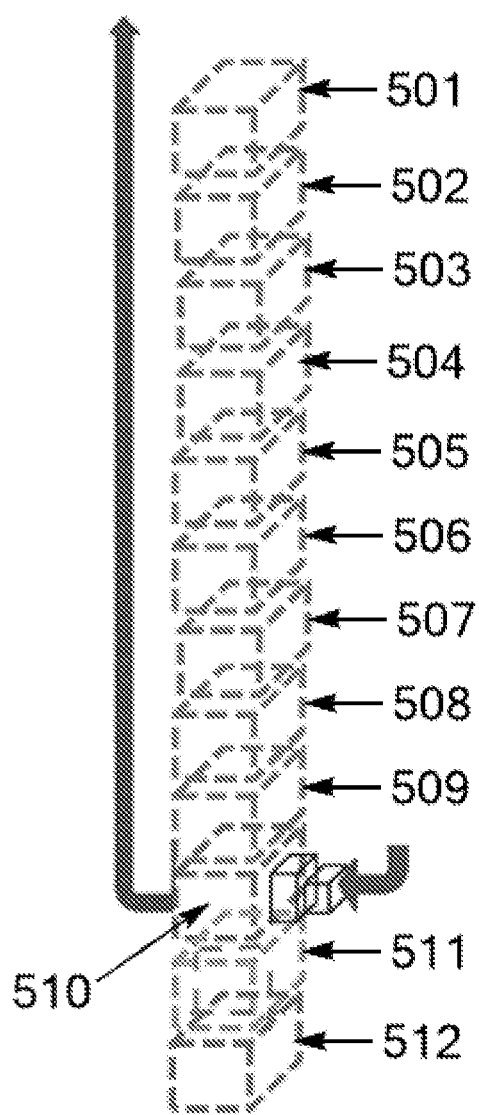
FIG. 5 depicts an embodiment of a modular a desulfurizing and decarbonizing apparatus that includes a desulfurizing and decarbonizing reactor module, a recirculation tank module, an equipment module, six spent chemical storage modules, and two fresh chemical storage modules.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

The embodiment depicted in FIG. 5 includes twenty-four modules, with twelve port-side modules and twelve starboard-side modules. This embodiment may be employed in a ship powered by a 12,000 horse-power (hp) diesel engine, for example. Only one container column, e.g., the starboard-side, is depicted for clarity, however, it is understood that this embodiment includes two columns of container modules, with the starboard-side containers mirroring the port-side containers.

The ship's exhaust gas is routed to desulfurization and decarbonization module 510. Fresh reagent from chemical storage modules 508 and 509 is used to desulfurize and decarbonize the exhaust gas. Decontaminated exhaust gas is routed from desulfurization and decarbonization module 510 and vented to the atmosphere. Spent reagent from module 510 flows downward into a recirculation tank in module 511. Recirculation tank may be housed within an equipment module that includes control systems, or the recirculation tank may be housed within a discrete module. In the embodiment depicted in FIG. 5, module 512 is a equipment module that does not house a recirculation tank.

Blowdown of spent reagent, e.g., Na2CQ3 Na2CO3 solution, is pumped from the recirculation tank in module 511 to the top of chemical storage module 501. Floor gates in chemical storage modules 501-506 are open at the start of system operation and the floor gate in chemical storage module 507 is closed. Spent reagent travels through chemical storage modules 501-506 and fills chemical storage module 507 first. When the spent reagent level has reached the top of chemical storage module 506, a level sensor and switch at this location releases the spring-loaded gate, which closes firmly against a flexible seal, for example, ethylene propylene diene terpolymer, and prevents draining into chemical storage module 507. This process may continue until chemical storage module 501 is filled. The spring-loaded gate's flexible seal ensures there is no leakage when unloading the containers. Each container may be provided with an inner wall to contain any liquid in the unlikely event of leaks. Spent chemical storage modules 501-507 and empty fresh chemical storage modules 508 and 509 may be unloaded with replacements loaded in port.

Figure 6:
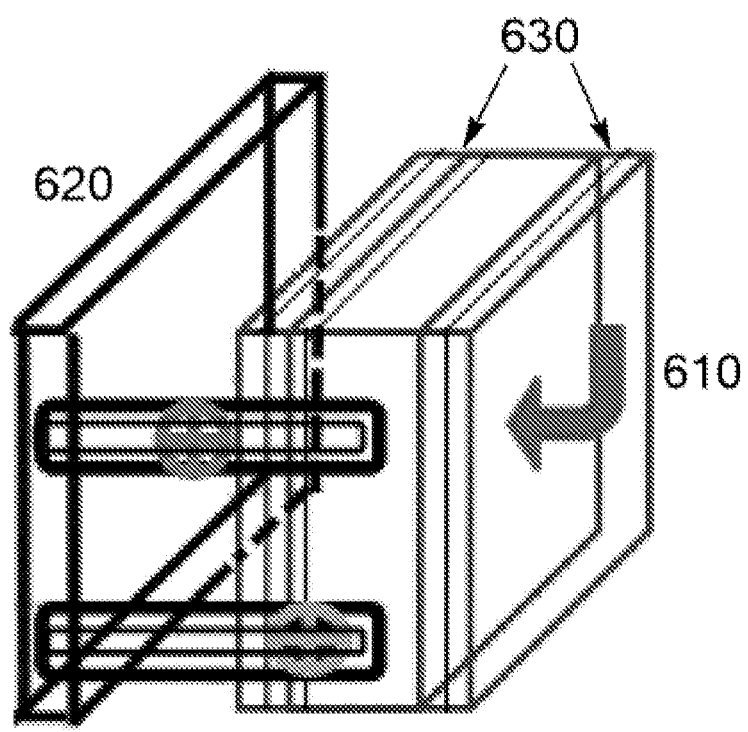
FIG. 6 depicts a duct-side flexible expansion joint coupling a gas inlet to the inside of a container side flange that allows for sliding along slots and enables connecting or disconnecting of the inlet from the flange.

The modular design disclosed herein minimizes the time required to unload and load designated containers when the ship has docked in port. Gas duct quick-connects and disconnects are described in FIG. 6. Device 610 is the duct conveying exhaust gas from the ship funnels to the desulfurization and decarbonization module. Device 620 is the flanged connection in the module. Devices 630 show a connection between the duct and the module. Piping, electrical, and instrument wiring may be routed inside mating manifolds inside and outside of each container, minimizing the number of conduit runs needed for each container. The mating manifolds may employ quick-connect and disconnect flanges. Use of these features will allow port staff to complete connections and disconnections in significantly less time than the duration of docking in port. Containers can be unloaded without pumping out of their contents, for example when a small ship is fitted with the modular apparatus disclosed herein. Alternatively, for large ships that include multiple columns of containers, flanged connections can be provided on containers to allow pumping out of spent reagent and replenishment with fresh reagent and makeup water. The containers to be unloaded and loaded may be located at the top of the container column in order to simplify removal and replacement.

Additional Embodiments

Embodiment 1: A modular desulfurization-decarbonization apparatus for removing contaminants from exhaust gas comprising: a desulfurizing and decarbonizing reactor module; an equipment module; and a chemical storage module.

Embodiment 2: The modular apparatus of embodiment 1, further comprising an exhaust gas conduit coupled to the desulfurizing and decarbonizing reactor module.

Embodiment 3: The modular apparatus of embodiment 1, wherein the desulfurizing and decarbonizing reactor module comprises a desulfurizer and a decarbonizer.

Embodiment 4: The reactor module of embodiment 3, wherein the desulfurizer is upstream of the decarbonizer.

Embodiment 5: The reactor module of embodiment 3, wherein the desulfurizer comprises a first liquid reagent distribution header.

Embodiment 6: The first liquid reagent header of embodiment 5, wherein the first liquid reagent distribution header comprises one or more liquid reagent outlets.

Embodiment 7: The reactor module of embodiment 3, wherein the desulfurizer comprises an exhaust gas inlet coupled to the exhaust gas conduit.

Embodiment 8: The reactor module of embodiment 3, wherein the desulfurizer comprises an SO2-lean gas outlet.

Embodiment 9: The reactor module of embodiment 3, wherein the desulfurizer comprises a SO2-lean gas duct coupled to the SO2-lean gas outlet.

Embodiment 10: The SO2-lean gas duct of embodiment 9, further comprising a mist eliminator.

Embodiment 11: The reactor module of embodiment 3, further comprising at least one SO2-lean gas fan.

Embodiment 12: The reactor module of embodiment 3, further comprising at least one first liquid reagent transfer pump.

Embodiment 13: The reactor module of embodiment 3, wherein the decarbonizer comprises an SO2-lean gas inlet coupled to the SO2-lean gas conduit.

Embodiment 14: The reactor module of embodiment 3, wherein the decarbonizer comprises a CO2-lean exhaust gas outlet.

Embodiment 15: The reactor module of embodiment 3, wherein the decarbonizer comprises a second liquid reagent distribution header.

Embodiment 16: The second liquid reagent header of embodiment 15, wherein the second liquid reagent distribution header comprises one or more liquid reagent outlets.

Embodiment 17: The reactor module of embodiment 3, wherein the decarbonizer comprises a CO2-lean gas outlet.

Embodiment 18: The reactor module of embodiment 3, further comprising at least one CO2-lean gas fan.

Embodiment 19: The reactor module of embodiment 3, further comprising at least one second liquid reagent transfer pump.

Embodiment 20: The reactor module of embodiment 3, wherein the decarbonizer comprises a CO2-lean gas duct coupled to the CO2-lean exhaust gas outlet.

Embodiment 21: The reactor module of embodiment 3, wherein the module optionally comprises a second decarbonizer downstream of the decarbonizer.

Embodiment 22: The equipment module of embodiment 1, wherein the equipment module comprises a first liquid reagent pump.

Embodiment 23: The equipment module of embodiment 1, wherein the equipment module comprises a second liquid reagent pump.

Embodiment 24: The equipment module of embodiment 1, wherein the equipment module comprises an SO2-enriched liquid reagent pump.

Embodiment 25: The equipment module of embodiment 1, wherein the equipment module comprises a CO2-enriched liquid reagent pump.

Embodiment 26: The equipment module of embodiment 1, wherein the equipment module comprises a recirculation tank.

Embodiment 27: The recirculation tank of embodiment 26, wherein the recirculation tank comprises a segregated spent sulfite tank.

Embodiment 28: The recirculation tank of embodiment 26, wherein the recirculation tank comprises a segregated sulfite recirculation tank.

Embodiment 29: The recirculation tank of embodiment 26, wherein the recirculation tank comprises a segregated spent carbonate tank.

Embodiment 30: The recirculation tank of embodiment 26, wherein the recirculation tank comprises a segregated makeup water tank.

Embodiment 31: The equipment module of embodiment 1, wherein the equipment module comprises a control system.

Embodiment 32: The control system of embodiment 31, wherein the control system is a Programmable Logic Controller.

Embodiment 33: The equipment module of embodiment 1, wherein the equipment module comprises a Human Machine Interface.

Embodiment 34: The equipment module of embodiment 1, wherein the equipment module comprises a Supervisory Control and Data Acquisition device.

Embodiment 35: The equipment module of embodiment 1, wherein the equipment module comprises system instrumentation.

Embodiment 36: The chemical storage module of embodiment 1, wherein the storage module comprises a segregated spent sulfite tank.

Embodiment 37: The chemical storage module of embodiment 1, wherein the storage module comprises a segregated spent carbonate tank.

Embodiment 38: The modular apparatus of embodiment 1, wherein the apparatus comprises two or more chemical storage modules.

Embodiment 39: The chemical storage module of embodiment 1, further comprising a hinged and spring-loaded floor opening.

Embodiment 40: The modular apparatus of embodiment 38, wherein the two or more chemical storage modules are provided in a vertically-stacked configuration.

Embodiment 41: The CO2-lean gas outlet of embodiment 17, wherein the outlet is coupled to a ship exhaust funnel.

Embodiment 42: The modular apparatus of embodiment 1, wherein the exhaust gas conduit is coupled to a control louver damper.

Embodiment 43: The modular apparatus of embodiment 1, wherein the control louver damper is coupled to a ship exhaust funnel.

Embodiment 44: The control louver damper of embodiment 43, wherein the damper is coupled to a port-side exhaust gas duct and a starboard-side exhaust gas duct.

Embodiment 45: The modular apparatus of embodiment 1, wherein the apparatus comprises: a port-side desulfurizing and decarbonizing reactor module; a starboard-side desulfurizing and decarbonizing reactor module: a port-side equipment module; a starboard-side equipment module; a port-side chemical storage module; and a starboard-side chemical storage module.

Embodiment 46: The modular apparatus of embodiment 1, wherein each module is housed within a distinct standard ISO shipping container.

Embodiment 47: The standard shipping containers of embodiment 46, wherein a size of each shipping container is independently selected from the group consisting of 10 ft., 20 ft., 40 ft., 20 ft. high cube, and 40 ft. high cube.

Embodiment 48: The modular apparatus of embodiment 45, wherein the port-side modules are provided in a stacked configuration on a port-side of a ship, and the starboard-side modules are provided in a stacked configuration on a starboard-side of the ship.

Embodiment 49: The modular apparatus of embodiment 1, wherein the apparatus is a port-starboard symmetrical system having an even number of each component, with at least one starboard-side component and at least one port-side component.

Embodiment 50: A method for removing CO2 and SO2 from an exhaust gas stream using a modular desulfurization-decarbonization apparatus, the method comprising the steps of:
  a) directing the exhaust gas stream into a desulfurizing and decarbonizing reactor module comprising a desulfurizer and decarbonizer;
  b) bringing the exhaust gas stream into contact with a first liquid reagent in the desulfurizer and absorbing into the reagent at least a part of the SO2 of the exhaust gas stream such that the gas stream is depleted in SO2 and the reagent is enriched in SO2;
  c) bringing the SO2-depleted gas into contact with a second liquid reagent in the decarbonizer and absorbing into the reagent at least a part of the CO2 of the SO2-depleted gas such that the gas stream is depleted in both SO2 and CO2 and the second reagent is enriched in CO2; and
  d) exhausting the SO2- and CO2-depleted gas to the atmosphere.

Embodiment 51: The method of embodiment 50, further comprising transferring the SO2-enriched reagent to an equipment module.

Embodiment 52: The method of embodiment 51, further comprising transferring the SO2-enriched reagent to a recirculation tank within the equipment module.

Embodiment 53: The method of embodiment 52, further comprising transferring the SO2-enriched reagent to a segregated spent sulfite tank within the recirculation tank.

Embodiment 54: The method of embodiment 50, further comprising transferring the SO2-enriched reagent to a chemical storage module.

Embodiment 55: The method of embodiment 50, further comprising transferring the CO2-enriched reagent to an equipment module.

Embodiment 56: The method of embodiment 55, further comprising transferring the CO2-enriched reagent to a recirculation tank within the equipment module.

Embodiment 57: The method of embodiment 56, further comprising transferring the CO2-enriched reagent to a segregated spent carbonate tank within the recirculation tank.

Embodiment 58: The method of embodiment 50, further comprising transferring the CO2-enriched reagent to a chemical storage module.

Embodiment 59: The method of embodiment 50, wherein the exhaust gas stream is divided into a port-side exhaust gas stream and a starboard-side exhaust gas stream.

Embodiment 60: The method of embodiment 59, wherein a control louver damper coupled to a ship exhaust funnel divides a ship exhaust gas stream into the port-side exhaust gas stream and the starboard-side exhaust gas stream.

Embodiment 61: The method of embodiment 59, wherein the port-side exhaust gas stream is directed to a port-side desulfurizing and decarbonizing reactor module.

Embodiment 62: The method of embodiment 59, wherein the starboard-side exhaust gas stream is directed to a starboard-side desulfurizing and decarbonizing reactor module.

Embodiment 63: The method of embodiment 62, further comprising transferring starboard-side SO2-enriched reagent to a starboard-side equipment module.

Embodiment 64: The method of embodiment 62, further comprising transferring port-side SO2-enriched reagent to a port-side equipment module.

Embodiment 65: The method of embodiment 62, further comprising transferring starboard-side SO2-enriched reagent to a starboard-side chemical storage module.

Embodiment 66: The method of embodiment 62, further comprising transferring port-side SO2-enriched reagent to a port-side chemical storage module.

Embodiment 67: The method of embodiment 62, further comprising transferring starboard-side CO2-enriched reagent to a starboard-side equipment module.

Embodiment 68: The method of embodiment 62, further comprising transferring port-side CO2-enriched reagent to a port-side equipment module.

Embodiment 69: The method of embodiment 62, further comprising transferring starboard-side CO2-enriched reagent to a starboard-side chemical storage module.

Embodiment 70: The method of embodiment 62, further comprising transferring port-side CO2-enriched reagent to a port-side chemical storage module.

Embodiment 71: The method of embodiment of embodiment 50, further comprising controlling gas and liquid transfer from an equipment module.

Embodiment 72: The method of embodiment 71, wherein controlling gas and liquid transfer is controlled by a control system housed within the equipment module.

Embodiment 73: The method of embodiment 59, wherein a port-side equipment module controls port-side gas and liquid transfer and a starboard-side equipment module controls starboard-side gas and liquid transfer.

Embodiment 74: The method of any of embodiments 50 to 73, wherein each module is housed within a distinct standard ISO shipping container.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

The invention claimed is:

1. A modular desulfurization-decarbonization apparatus for removing contaminants from exhaust gas comprising:
a desulfurizing and decarbonizing reactor module;
an equipment module;
a chemical storage module;
wherein the desulfurizing and decarbonizing reactor module comprises a desulfurizer and decarbonizer;
wherein the desulfurizer comprises a first liquid reagent distribution header;
wherein the first liquid reagent distribution header comprises one or more liquid reagent outlets; and
wherein the equipment module comprises a recirculation tank, a first liquid reagent pump and a second liquid reagent pump.

2. The modular desulfurization-decarbonization apparatus of claim 1, wherein the recirculation tank comprises a segregated spent sulfite tank.

3. The modular desulfurization-decarbonization apparatus of claim 1, wherein the recirculation tank comprises a segregated sulfite recirculation tank.

4. The modular desulfurization-decarbonization apparatus of claim 1, wherein the recirculation tank comprises a segregated makeup water tank.

5. The modular desulfurization-decarbonization apparatus of claim 1,
wherein the equipment module comprises a control system;
wherein the control system is a Programmable Logic Controller.

6. The modular desulfurization-decarbonization apparatus of claim 1, further comprising two or more chemical storage modules;
wherein 1 chemical storage module comprises a segregated spent carbonate tank.

7. The modular apparatus desulfurization-decarbonization of claim 6, wherein the two or more chemical storage modules are provided in a vertically stacked configuration.

8. The modular desulfurization-decarbonization apparatus of claim 1, wherein the chemical storage module comprises a hinged and spring-loaded floor opening.

9. The modular apparatus desulfurization-decarbonization of claim 1, wherein the decarbonizer comprises a CO2-lean gas outlet;
wherein the outlet is coupled to a ship exhaust funnel.

10. The modular apparatus desulfurization-decarbonization of claim 1, wherein the apparatus comprises: a port-side desulfurizing and decarbonizing reactor module;
a starboard-side desulfurizing and decarbonizing reactor module; a port-side equipment module;
a starboard-side equipment module;
a port-side chemical storage module;
and a starboard-side chemical storage module.

11. The modular apparatus desulfurization-decarbonization of claim 1, wherein each module is housed within a distinct standard ISO shipping container.

12. The modular apparatus desulfurization-decarbonization of claim 11, wherein a size of each shipping container is independently selected from the group consisting of 10 ft., 20 ft., 40 ft., 20 ft. high cube, and 40 ft. high cube.

13. The modular apparatus desulfurization-decarbonization of claim 1, wherein an exhaust gas conduit is coupled to a control louver damper.

14. The modular apparatus desulfurization-decarbonization of claim wherein a control louver damper is coupled to a ship exhaust funnel.

15. The modular apparatus desulfurization-decarbonization of claim 14, wherein the control louver damper is coupled to a port-side exhaust gas duct and a starboard-side exhaust gas duct.

16. The modular apparatus desulfurization-decarbonization of claim 10, wherein the port-side modules are provided in a stacked configuration on a port-side of a ship, and the starboard-side modules are provided in a stacked configuration on a starboard-side of the ship.

17. The modular apparatus desulfurization-decarbonization of claim 1, wherein the apparatus is a port-starboard symmetrical system having an even number of each component, with at least one starboard-side component and at least one port-side component.

18. The modular apparatus desulfurization-decarbonization of claim 1, wherein the Chemical storage module comprises a segregated spent sulfite tank.

* * * * *